United States Patent
Kelly et al.

(10) Patent No.: US 7,822,019 B2
(45) Date of Patent: Oct. 26, 2010

(54) DIRECTION OF COMMUNICATIONS SESSIONS TO CONTACT CENTERS

(75) Inventors: Paul Kelly, Galway (IE); Tony McCormack, Galway (IE)

(73) Assignee: Avaya, Inc., Basking Ridge, NJ (US)

( * ) Notice: Subject to any disclaimer, the term of this patent is extended or adjusted under 35 U.S.C. 154(b) by 415 days.

(21) Appl. No.: 11/537,060

(22) Filed: Sep. 29, 2006

(65) Prior Publication Data

US 2008/0080506 A1 Apr. 3, 2008

(51) Int. Cl.
*H04L 12/66* (2006.01)
*H04L 12/28* (2006.01)
*H04M 7/00* (2006.01)
*H04M 3/00* (2006.01)

(52) U.S. Cl. .................. 370/352; 370/389; 370/392; 370/401; 379/219; 379/265.01; 379/265.09; 379/266.02

(58) Field of Classification Search .................. None
See application file for complete search history.

(56) References Cited

U.S. PATENT DOCUMENTS

| | | | | |
|---|---|---|---|---|
| 5,546,452 A | * | 8/1996 | Andrews et al. | 379/219 |
| 6,763,104 B1 | * | 7/2004 | Judkins et al. | 379/265.09 |
| 2003/0108183 A1 | * | 6/2003 | Dhir et al. | 379/265.01 |
| 2004/0028213 A1 | * | 2/2004 | Goss | 379/265.09 |
| 2005/0135595 A1 | * | 6/2005 | Bushey et al. | 379/265.01 |
| 2006/0098803 A1 | * | 5/2006 | Bushey et al. | 379/266.02 |
| 2006/0146806 A1 | * | 7/2006 | Khuc et al. | 370/352 |
| 2006/0153173 A1 | * | 7/2006 | Beck et al. | 370/352 |
| 2006/0256950 A1 | * | 11/2006 | Patel et al. | 379/265.02 |
| 2006/0262922 A1 | * | 11/2006 | Margulies et al. | 379/265.12 |
| 2007/0133780 A1 | * | 6/2007 | Berner et al. | 379/265.01 |
| 2007/0201684 A1 | * | 8/2007 | Boghani | 379/360 |
| 2007/0211881 A1 | * | 9/2007 | Parker-Stephen | 379/265.01 |
| 2008/0056464 A1 | * | 3/2008 | Kalahasti et al. | 379/88.18 |

* cited by examiner

*Primary Examiner*—Huy D Vu
*Assistant Examiner*—Brandon Renner
(74) *Attorney, Agent, or Firm*—Barnes & Thornburg LLP

(57) ABSTRACT

A communications session directed at a group of contact centers is held outside the contact centers at an IVR server, while the requirements of the session are determined. A request is formulated specifying the requirements, and this request is sent to a web services provider agent exposed by the group of contact centers. The request is forwarded to the contact centers which collectively respond with an identification of an address associated with a specific endpoint to which the communications session should be sent in order that it will receive the specified handling. The IVR server holding the call can thereby direct the session to a suitable endpoint without having any need to remain aware of the state of the contact centers or the agents within those centers.

11 Claims, 2 Drawing Sheets

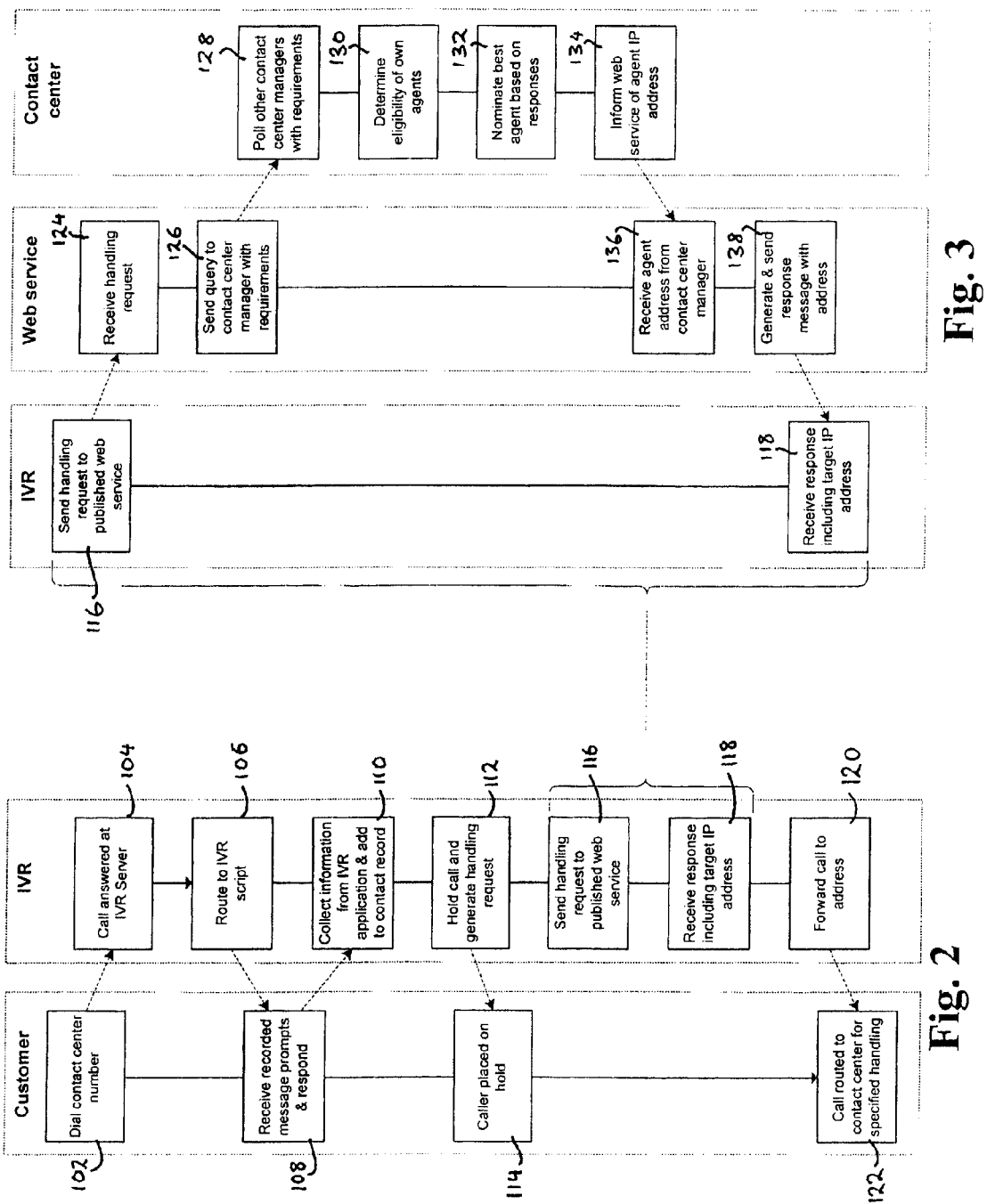

DIRECTION OF COMMUNICATIONS SESSIONS TO CONTACT CENTERS

TECHNICAL FIELD

This invention relates to the direction of communications sessions to and within contact centers.

BACKGROUND ART

Conventional contact centers receive communications sessions such as voice and video calls, and chat sessions, from external parties. The sessions are analysed, typically by being directed through an automated application which discerns the most appropriate endpoint or group of endpoints, based on the responses of the external party (referred to as the "customer" for convenience). Typically, the endpoint or group of endpoints will be an agent or an agent group, respectively. However, the session may equally be directed to an endpoint which is, for example, an automated application.

It is increasingly common for contact centers to be grouped together so that they present a unified external appearance as a "distributed contact center" or "networked contact center". The contact center may also include a virtual contact center element, which denotes a set of agents and applications which are not physically grouped together but which are part of the same organisational structure. In any distributed contact center environment, there will be issues of duplication of function between the component contact centers. Communications may need to be redirected from one center to another and this causes problems with managing and synchronising the data between the various contact centers so that the optimum routing is chosen.

One solution is known from US Patent Specification U.S. Pat. No. 5,546,452 assigned to GeoTel Communications Corp. The GeoTel system involves a primary central controller which makes routing decisions on behalf of a plurality of contact centers. The central controller has global authority and operates on the basis of information gathered in real-time from the entire network of contact centers. The central controller remains aware of the state of each agent and selects the most appropriate agent for each call it receives. In such a system the administrative load on the central controller is very high. While the system is indicated to have a redundant central controller in case of failure of the primary controller, there is nevertheless a problem in the volume of data and processing required at the central controller, particularly where it is to handle ever increased volumes of calls and large distributed contact centers.

A further disadvantage with such a system is that the controller must be specifically configured to communicate with the particular contact centers under its control, meaning that it is not readily adaptable. It is often desirable for a distributed contact center to dynamically recruit its constituent members to meet its expected call load. Contact centers an be independent commercial entities available for hire by organisations, and this model requires that the individual centers can slot into and out of the distributed or networked contact center system. This is not possible when a central controller needs to be configured and adapted to the specific parameters of the contact centers under its control, since the configuration time is far greater than the time-scale over which such centers are expected to join and leave the network. Note that calls, contacts and sessions are used interchangeably in the text below.

DISCLOSURE OF THE INVENTION

The invention provides a method of directing a communications session to an endpoint in a contact center, the method involving the following steps:
    (a) receiving and holding the communications session outside the contact center;
    (b) sending a request to an interface exposed by the contact center, the request specifying at least one requirement to be satisfied by a contact center endpoint for handling the communications session;
    (c) receiving from the interface an indication of a network address associated with an endpoint satisfying the requirement; and
    (d) directing the communications session to the network address.

This method allows an external controller to defer decision making to the contact center itself, thereby dramatically reducing the processing power required.

Furthermore, because it introduces an intermediate interface, the controller can simply place requests for handling communications sessions with the interface. The interface may use open standards so that a variety of different contact center architectures each interact with the interface or one another, while the external entity directing the communications session remains blind to the details of the contact centers.

From the viewpoint of the external entity which initially holds the session outside of the contact center(s), only an interface is visible to which a request is placed. In response to this request a network address indication is received and this information is sufficient for the external entity to redirect the communications session.

The method additionally takes advantage of the fact that contact centers are themselves highly adapted to evaluate the best destination for any given call or session, and that there is therefore a synergy to be achieved by holding the call outside of an interface and redirecting it to a destination chosen by the contact center itself. A group of contact centers can collectively decide on the best destination for any given session using any suitable mechanism or protocol, while simply transmitting to the interface the result of its determination in the form of an indication of a network address to which the session should be sent.

The method preferably also includes the step of pre-processing the communications session in order to determine the requirement(s) which have to be satisfied by a contact center endpoint.

Thus, rather than being a "dumb" switch, the entity holding the session prior to forwarding it to the contact center may be endowed with capabilities to evaluate the session and the requirements of the endpoint which will service the session.

For example, the pre-processing may involve routing the communications session to an interactive script and recording the interactions with the script.

Preferably, where pre-processing occurs, the request will itself include information determined or gleaned during the pre-processing.

In a preferred embodiment, the method is implemented in an interactive voice response (IVR) system. The IVR system will typically be an application residing on a server outside the interface with the contact center. (Physically or organisationally, the IVR server may of course be co-located with one or more contact center entities and may be managed by the contact center organisation.) Rather than routing calls to IVR when inside the contact center, the calls can be routed to IVR (or equivalent pre-processing) before a decision is taken as to where the session will be routed. The results of the IVR session can form the basis for the request to the interface, and one or more contact centers may respond to the request (or collaborate in a response) to determine where the session should be routed.

Preferably, the step of sending a request involves formulating the request as a request for web services.

Web services provide a highly suitable mechanism for the various entities in the method to interact according to a shared vocabulary, irrespective of the individual configurations and protocols employed internally by each entity.

Suitably, the request for web services is formulated for conformance with a set of web services exposed by the interface.

Thus, the interface can publish the requirements which must be met by a valid request for services. Typically one or more contact center organisations will create such a set of requirements according to the abilities of the contact centers to handle communications sessions.

Preferably, the web services exposed by the interface include a description of the available services which includes a specification of available requirements which may be included in the request.

Preferably, the requirement(s) in the request is selected from:
  a request for a callback to a party to the communications session;
  an indication of an agent skillset required to deal with the communications session;
  a request to provide a recorded media stream to the communications session;
  a request to place the communications session in a conference;
  a request to connect the communications session with an available agent; and
  a request to connect the communications session to an interactive script.

Thus, any such requirement can be specified at the determination of the entity making the request, and the contact center(s) behind the interface can evaluate which of their endpoint(s) are best positioned to handle such requirements.

This aspect of the invention also provides a computer program product which includes instructions which, when executed in a processor of a communications handling apparatus located externally of a contact center, are effective to cause the apparatus to:
  (a) receive and hold a communications session at the apparatus outside the contact center;
  (b) send a request to an interface exposed by the contact center, the request specifying at least one requirement to be satisfied by a contact center endpoint for handling the communications session;
  (c) await from the interface an indication of a network address associated with an endpoint satisfying the requirement; and
  (d) direct the communications session to the network address.

It may happen that a network address is not available, and rather than holding the session externally to the contact center network, the interface returns an address which will result in the session being queued within the contact center network. This technique will reduce the capacity requirements for the IVR system, as it will not be holding large number of calls during periods where, e.g., no agents are available.

The invention also provides an apparatus for directing a communications sessions to an endpoint in a contact center, comprising:
  (a) a network connection for receiving a communications session outside the contact center;
  (b) a processor for determining at least one requirement to be satisfied by a contact center endpoint for handling the communications session;
  (c) an outbound messaging system for issuing a request to an interface exposed by the contact center, the request specifying the at least one requirement;
  (d) an inbound messaging system for receiving from the interface an indication of a network address associated with an endpoint satisfying the requirement; and
  (e) a routing system for directing the communications session to the network address.

Preferably, the outbound messaging system is implemented as a web service requester agent.

The apparatus may advantageously be implemented in an interactive voice response system.

the apparatus can alternatively be implemented in a contact center, or in a network switch.

The invention provides, in a further aspect, a method of routing a communications session within a contact center, comprising the steps of:
  (a) exposing an interface to a network, the interface being configured to receive external requests for handling communications sessions held externally of the contact center and to forward the requests to a management unit of the contact center;
  (b) receiving at the management unit of the contact center a request from the interface which specifies at least one requirement to be satisfied by a contact center endpoint for handling the communications session;
  (c) determining a network address associated with a contact center endpoint satisfying the at least one requirement; and
  (d) responding to the request with an indication of the network address.

Preferably, the step of exposing an interface involves providing a web service provider agent which is adapted to receive requests conforming to a predetermined structure and to forward the requests in a suitable format to be interpreted by the management unit.

Preferably, the web service provider agent is further adapted to make available to external entities a description of requests according to which it can act.

Suitably, the requirement is a requirement to be satisfied by a contact center agent and the step of determining a network address comprises identifying an agent of the contact center, who is recorded in an agent record as suitable to meet the at least one requirement, and determining a network address to which the communications session should be routed to connect to the agent.

In a preferred embodiment, the contact center is a networked contact center composed of a plurality of management units each controlling a respective group of contact center resources, and the step of determining a network address comprises a first one of the management units communicating the requirement to one or more of the other management units, awaiting from the one or more other management units a response indicative of the network address, and communicating the network address in the response.

Once again it can be seen that this architecture allows the routing decision to be deferred to the contact centers themselves, and the result of that determination to be communicated as an identification of the network address to which the session should be sent.

Preferably, the requirement is communicated to a plurality of the management units, and the step of awaiting a response includes awaiting a plurality of responses and selecting a network address from the plurality of responses.

Suitably, the communicated network address may relate to a resource controlled by one of the other management units, and the request is passed to that other management unit for use as a representation of the communications session.

This enables a token system to be used in which the request, which can include all details obtained in pre-processing the communications session outside the networked contact center, is used as a token of the session. The transactions involving that session can be recorded in this token and this can then be analysed once the session is terminated, thereby providing true "cradle to grave" reporting of the communications session. Such reporting is conventionally very difficult to achieve in a distributed contact center environment.

The invention also provides a computer program product comprising instructions which, when executed in a processor of a contact center having a connection to an external interface, are effective to cause the contact center to:
(a) upon receiving from the interface a request originating at an external entity which specifies at least one requirement to be satisfied by a contact center endpoint for handling a communications session, determining a network address associated with a contact center endpoint satisfying the at least one requirement; and
(b) responding to the request with an indication of the network address.

The invention further provides a contact center comprising:
(a) a plurality of endpoints for handling communications sessions;
(b) a contact center management unit adapted to control the routing of communications sessions to the endpoints;
(c) an external interface exposing a service provider agent to a network, the service provider agent being adapted to receive external requests for handling communications sessions in accordance with at least one requirement contained in the requests, and to transmit the requests to the contact center management unit;
wherein the management unit is configured to receive the requests from the service provider unit and to respond with a network address associated with a contact center endpoint satisfying the at least one requirement.

In another aspect the invention provides a method of routing a communications session within a plurality of contact centers, comprising the steps of:
(a) exposing a single interface to a network, the interface being configured to receive external requests for handling communications sessions held externally of the plurality of contact centers and to forward the requests to a management unit of at least one of the contact centers;
(b) receiving at the management unit of the at least one contact center a request from the interface which specifies at least one requirement to be satisfied by a contact center endpoint for handling the communications session;
(c) determining a network address associated with a contact center endpoint satisfying the at least one requirement; and
(d) responding to the request with an indication of the network address.

Preferably, the contact center endpoint, with which the network address is associated, is under the control of a different management unit being a management unit of another of the contact centers, the method further comprising the step of sending the request to the different management unit, and the different management unit employing the request as a representation of the communications session for use in subsequent processing of the communications session when it arrives at the network address.

Suitably, the interface is configured to forward the requests to a plurality of management units each associated with a different contact center.

The plurality of management units can be programmed to co-operate in identifying a single network address for use in the response.

A distributed contact center system is also provided in this aspect of the invention, the system comprising a plurality of contact centers sharing a single network interface, wherein each contact center comprises:
(a) a plurality of endpoints for handling communications sessions; and
(b) a contact center management unit adapted to control the routing of communications sessions to the endpoints;
wherein the interface exposes a service provider agent to a network, the service provider agent being adapted to receive external requests for handling communications sessions in accordance with at least one requirement contained in the requests, and to forward the requests to a management unit of at least one of the contact centers;
and wherein the management unit of at least one of the contact centers is configured to receive the requests from the service provider unit and to respond with a network address associated with a contact center endpoint satisfying the at least one requirement.

BRIEF DESCRIPTION OF DRAWINGS

The invention will be further illustrated by the following description of embodiments thereof, given by way of example only, with reference to the accompanying drawings, in which:

FIG. 2 is a flowchart illustrating an interaction between a customer and an interactive voice response (IVR) server in the system of FIG. 1;

FIG. 3 is a flowchart illustrating a corresponding interaction between the (IVR) server, a web service, and a contact center, in the system of FIG. 1;

DETAILED DESCRIPTION OF PREFERRED EMBODIMENTS

Figure 1:
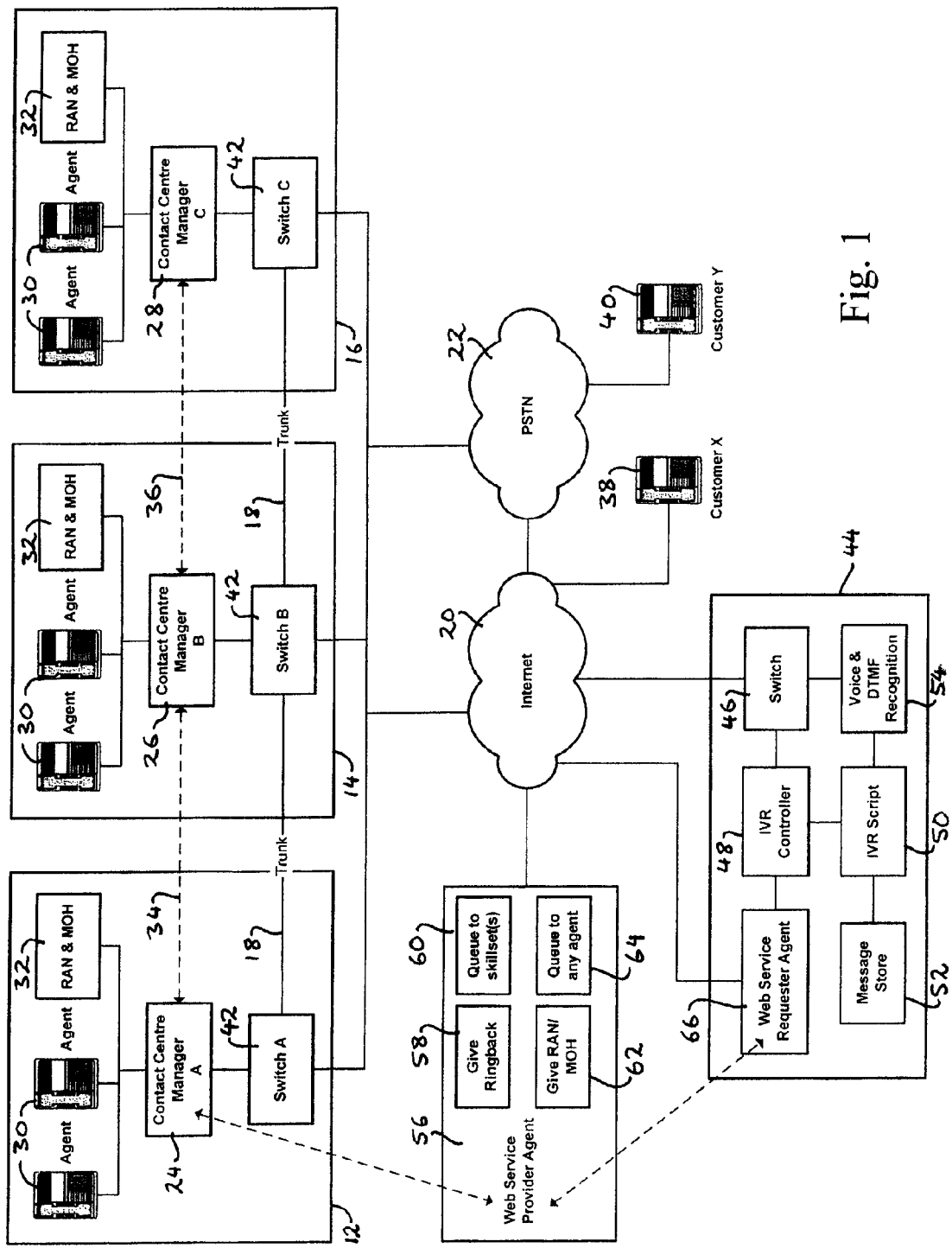
FIG. 1 is a block diagram of an architecture for use in a system and method of the invention.

In FIG. 1 a group of three contact centers 12,14,16 are shown connected to each other by dedicated trunk lines 18. Each contact center is in communication with the Internet 20 and with the public switched telephone network (PSTN) 22, in known manner, such that voice and video calls, as well as diverse other communications, can be received from and made to the Internet and/or the PSTN 22, as appropriate.

The trunk lines 18 enable calls to be switched from one contact center to another. Each contact center has a respective set of sophisticated control applications and functions, usually embodied as software on one or more dedicated servers, which are collectively referred to herein as a respective contact center manager 24,26,28.

Contact center managers 24,26,28 employ conventional controls to cause communications sessions to be analysed, queued, and connected to agents 30 of the contact center or to applications such as a music-on-hold (MOH) or recorded announcement (RAN) server 32. The internal operation of the contact center in this regard is well known to the skilled person and can be implemented in many ways depending on numerous design choices made by the vendor or purchaser of the contact centers.

Each contact center need not be identical and need only be compatible to the extent that the contact center managers 24,26,28 are able to communicate with one another to control the transfer of communications sessions between the three contact centers. To this end, the managers 24,26,28 are shown as being connected via dedicated signalling channels 34,36 which may be carried over a wide area network or over the Internet, as appropriate. (Similarly, the dedicated trunk lines 18 can be dispensed with and calls can be transferred over the Internet or PSTN or over a wide area network, if sufficient bandwidth and quality of service exists.)

Customers 38,40 wishing to avail of the services offered by the contact centers may connect via the PSTN 22 or via the Internet 20. In a conventional scenario, the customer would dial a number associated with the contact center, causing the call to arrive at a switch 42 within one of the contact centers 12,14,16. The call would then be routed to IVR and then queued to one of the local agents 30, or possibly transferred to another of the contact centers.

According to the present invention, however, the call is not connected directly to one of the contact centers. Instead the call will arrive at an entity outside the contact centers, which in this case is embodied as an IVR server 44.

Additional reference will now be made to FIG. 2, which is a flow chart showing the interaction between a customer (left hand side) and the IVR server (right hand side). When the customer dials the number, step 102, the call is routed over the Internet and/or PSTN to arrive at the IVR server 44, which answers the call, step 104, at an IVR switch 46.

The call is routed to an IVR controller 48 which creates a contact record (not shown) and begins to run an IVR script 50, step 106. The script operates in known manner by retrieving messages from a message store 52 and playing them to the customer, and simultaneously employing a module 54 which recognises and interprets voice and DTMF prompts received from the customer as a means of navigating the IVR script, step 108.

The customer contact record associated with the call is updated according to the options chosen by the customer and the responses provided to specific prompts, step 110. Typically, such information will enable a routing decision to be taken, i.e. will identify the skillset(s) required by an agent of a contact center to effectively handle the call. The information can however identify that no agent contact is needed and that the customer is seeking a callback, or that the customer is seeking some other automated treatment.

The IVR controller 48 then causes the call to be placed on hold, and generates a request for handling the call according to the information already gathered, steps 112 and 114. Thus, this handling request might specify that the call requires a French-speaking agent with skillsets to support a technical query relating to a video card installation. The details and format of the request are dependent on the service to which the request is to be sent, and in a preferred embodiment, the request is generated to conform with parameters published by a web service provider agent, as will now be described.

A web service 56 is exposed by the three contact centers 12,14,16 and is available on the Internet to the IVR server 44. The web service takes the role of a web service provider agent offering a number of services on behalf of the contact centers, such as the facility to provide a ringback (callback) 58, the facility to queue a call to particular skillsets 60, the facility to provide a recorded announcement or music on hold service 62 or the facility to queue to any agent, regardless of skillset (i.e. queue t first available agent) 64.

As is described in the web services architecture standard of the World Wide Web Consortium (http://www.w3.org/TR/ws-arch), web services are offered by a provider agent to a requester agent. In this case the provider agent is webs service agent 56 and the requester agent is implemented as a software agent 66 on IVR server 44.

The requester agent determines which services are offered by the provider agent (in this case services 58,60,62,64) or is pre-programmed with a list of such services. It then formulates the request for call handling in accordance with the web services description, i.e. the syntax published by the provider agent 56.

The IVR server does not need to know the identity of the contact centers, or the protocols to interact with them, and nor does it even need to know how many contact centers are behind the web service 56. Unlike known call distribution servers, the IVR server has no need to interact with or keep track of the individual agents or indeed to keep track of the activity of the contact centers at a statistical level. It simply receives calls, and holds them outside the contact centers while it formulates and submits to the web service provider agent 56 a request for call handling, step 116.

(It should be noted that the IVR server is simply one example of a suitable entity for holding the communications session and for submitting a request for handling the session. The IVR function could be omitted entirely and indeed in a simplified implementation a switch programmed to hold calls and submit requests could be used. Such a switch would of course not be able to offer the same depth of call analysis, but the principle of the call routing function would be the same.)

The processing of the request will be described further below with reference to FIG. 3. From the point of view of the IVR server 44, this call-handling request is followed by a response which provides an indication of an IP address or other network address to which the call is to be redirected, step 118. The IVR server forwards the call to the specified address, step 120, which results in the caller being routed to one of the contact centers for handling in accordance with the submitted request, step 122.

Note that the IVR server never needs to be made aware of the state of any of the contact centers or of any individual endpoint. The web service 56 instead acts as an intermediary which receives requests to handle calls, and passes these to the contact centers. The responses to these requests are then taken as being an instruction to pass the call over to a specified endpoint, on the basis that the contact centers are best equipped to make decisions about handling communications sessions.

Referring additionally to FIG. 3, a further flowchart is shown, which shows the interaction between the IVR server 44 (left hand side), the web service 56 (center) and one of the contact centers 12 (right hand side). The contact center in question is denoted the primary contact center in this arrangement, as it is configured to interact directly with the web service 56 on behalf of all three contact centers 12,14,16. Other arrangements are also possible in which each contact center interacts equally with the web service 56.

The web service provider agent receives the request from the IVR server 44 in step 124. The web service provider agent is programmed to pass on such requests to contact center manager "A" (manager 24 of contact center 12), step 126. The request is formulated in a manner which will be understood by the contact center manager 24. This can be accomplished by the web service provider agent re-formulating the request to conform with a proprietary standard for the contact center, or by the contact center being programmed to receive and act on requests of the format specified in the web services description exposed by the web service 56.

Because contact center manager "A" is receiving the request for handling a session on behalf of the group of contact centers, it polls each of the other contact center managers "B" and "C" (managers 26,28) via communications channels 34 and 36, step 128. Contact center manager "A" then determines the eligibility of its own agents to meet the requirements of the request, step 130.

Thus, each contact center manager is provided with an opportunity to match its resources against the request. In the example given of a French speaking agent having a skillset of technical support for video card installation, each center would determine if it had an agent meeting some or all of the requirements, and if so, the strength of the match and the likely wait time. Contact center managers "B" and "C" 26,28 respond to contact center manager "A" with their best offer, and contact center manager "A" then nominates the best available agent across the three contact centers based on the various offers received, step 132. If no agent is immediately available, then the best match might be the shortest queue in an appropriate skillset.

Whatever the result of the determination, an endpoint can be identified to which the communications session should be directed (the endpoint could be an agent IP address, an IP address associated with a particular queue or an application such as MOH/RAN server 32, or an IP address or port associated with a callback facility. Of course the contact center managers could also decide that the call should be routed to an internal IVR system. Additionally, it is possible that the webservice allows the IVR system to specify the treatment a call should receive (e.g. announcements etc.) should it be queued following being routed to the contact center network.

The contact center manager "A" informs the web service 56 of the IP address selected for the call, step 134. the web service provider agent receives the IP address indication in step 136 and formulates a response to the IVR server, step 138. The involvement of the web service in this part of the process is optional: the contact center manager could instead send its response directly to the IVR server, omitting the web service 56. When the IVR server 44 receives back the response, step 118, processing proceeds in accordance with the remainder of FIG. 2 as described earlier.

The request, which can incorporate all of the history of the contact and the details gathered by the IVR server, can be used as a token to represent the communications session during its entire life. Thus, if contact center manager "A" receives this request/token and the result of the polling is that contact center manager "B" supplies the IP address of the agent chosen to take the call, then contact center manager "B" can take ownership of the request/token even after contact center manager "A" has signalled its response. Contact center manager "B" will note the arrival of the communications session from the IVR server and may employ the token to store further details of the interaction between the caller and the agent, for example. Thus, all of the statistical information normally gathered within the contact center 14 can be copied into the token, which thus retains a complete history of the communications session from "cradle to grave". This facilitates statistical reporting for communications which may have a history at a number of different contact centers. Should it be necessary to transfer the communications session from the agent at contact center 14 back to some other endpoint at contact center 12, then the token can simply be transferred back to contact center manager "A" so that manger "A" receives a token including a history of the updated activity.

In an alternative embodiment, none of the contact centers is nominated as a primary contact with the interface or web service 56. Instead, the web service communicates the contents of each request to each of the contact center managers 24,26,28, and each manager is free to respond with its best offer. The web service then selects from among the received offers and nominates an address of a suitable endpoint which it communicates back to the IVR server or the switch holding the call. Such an arrangement may be preferred in situations where the constitution of the group of contact centers is changing dynamically and where the contact centers may be mutually incompatible with one another while each conforming to the protocol of the exposed common interface 56.

The invention is not limited to the embodiments described herein which may be varied or modified without departing from the scope of the invention.

The invention claimed is:

1. A method of routing a communications session within a contact center, comprising the steps of:
   (a) exposing an interface to a network, said interface being configured to receive requests from an external entity for handling communications sessions, said communications sessions being held externally of the contact center, and to forward said requests to a management unit of the contact center, wherein said contact center is a networked contact center composed of a plurality of management units each controlling a respective group of contact center endpoints;
   (b) receiving at a first one of said management units one of said requests forwarded from said interface which specifies at least one requirement to be satisfied by a contact center endpoint for handling the communications session;
   (c) a first one of said management units determining a network address associated with a contact center endpoint satisfying said at least one requirement by communicating said requirement to one or more of the other management units, awaiting from said one or more other management units a response indicative of said network address; and
   (d) said first one of said management units responding to said one of said requests with an indication of said network address received from said one or more other management units.

2. A method as claimed in claim 1, wherein said step of exposing an interface comprises providing a web service provider agent configured to receive requests conforming to a predetermined structure and to forward said requests in a suitable format to be interpreted by said management unit.

3. A method as claimed in claim 2, wherein said web service provider agent is further configured to make available to external entities a description of requests according to which it can act.

4. A method as claimed in claim 1, wherein said requirement is a requirement to be satisfied by a contact center agent and said step of determining a network address comprises identifying an agent of the contact center, who is recorded in an agent record as suitable to meet said at least one requirement, and determining a network address to which said communications session should be routed to connect to said agent.

5. A method as claimed in claim 1, wherein said requirement is communicated to a plurality of said management units and wherein said step of awaiting a response includes awaiting a plurality of responses and selecting a network address from said plurality of responses.

6. A method as claimed in claim 1, wherein said communicated network address relates to a resource controlled by one of said other management units and wherein said request is passed to said one of said other management units for use as a representation of said communications session.

7. A method of routing a communications session within a plurality of contact centers, comprising the steps of:
   (a) exposing a single interface to a network, said interface being configured to receive requests from an external entity for handling communications sessions, said communications sessions being held externally of the plurality of contact centers, and to forward said requests to a first management unit of at least one of the contact centers;
   (b) receiving at said first management unit of said at least one contact center one of said requests forwarded from said interface which specifies at least one requirement to be satisfied by a contact center endpoint for handling the communications session;
   (c) sending said request to a second management unit being a management unit of another of said contact centers;
   (d) said first management unit determining from said second management unit a network address associated with a contact center endpoint satisfying said at least one requirement, wherein said contact center endpoint with which said network address is associated, is under the control of said second management unit; and
   (e) said first management unit responding to said one of said requests with an indication of said network address.

8. A method as claimed in claim 7, the method further comprising the step of said second management unit employing said request as a representation of said communications session for use in subsequent processing of said communications session when it arrives at said network address.

9. A method as claimed in claim 7, wherein said interface is configured to forward said requests to a plurality of management units each associated with a different contact center.

10. A method as claimed in claim 9 wherein said plurality of management units are programmed to co-operate in identifying a single network address for use in said response.

11. A distributed contact center system comprising a plurality of contact centers sharing a single network interface, wherein each contact center comprises:
   (a) a plurality of endpoints for handling communications sessions; and
   (b) a contact center management unit configured to control the routing of communications sessions to said endpoints;
   wherein said interface exposes a service provider agent to a network, said service provider agent being configured to receive requests from an external entity for handling communications sessions in accordance with at least one requirement contained in said requests, and to forward said requests to a first management unit of at least one of the contact centers;
   and wherein said first management unit of at least one of the contact centers is configured to receive said requests from said service provider agent, to send said requests to a second management unit being a management unit of another of said contact centers, to determine from said second management unit a network address associated with a contact center endpoint satisfying said at least one requirement, wherein said contact center endpoint with which said network address is associated, is under the control of said second management unit, and to respond with said network address associated with said contact center endpoint satisfying said at least one requirement.

* * * * *